J. REIF.
SAW FILING MECHANISM.
APPLICATION FILED JUNE 1, 1920.
1,407,168.
Patented Feb. 21, 1922.
4 SHEETS—SHEET 3.
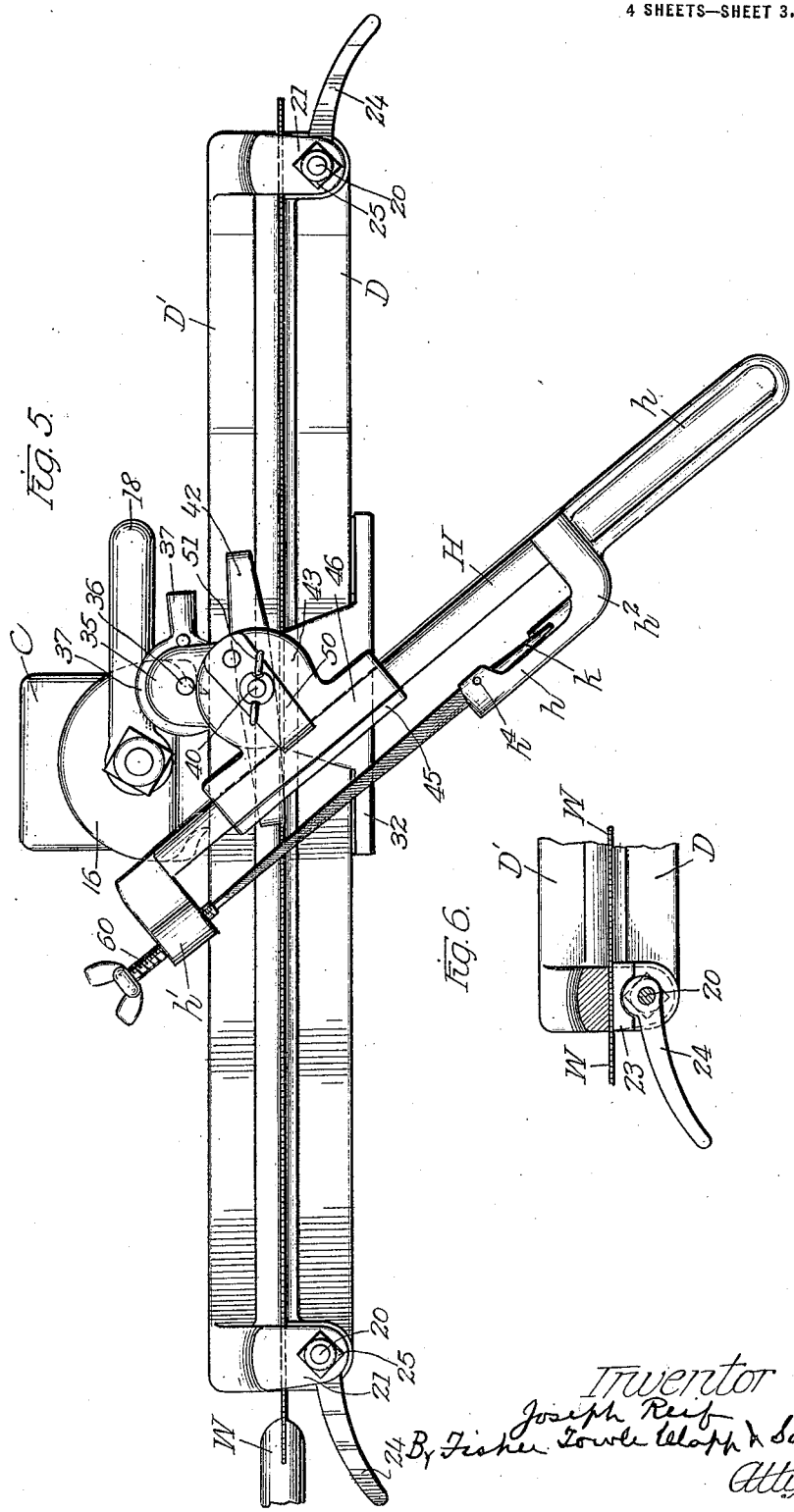

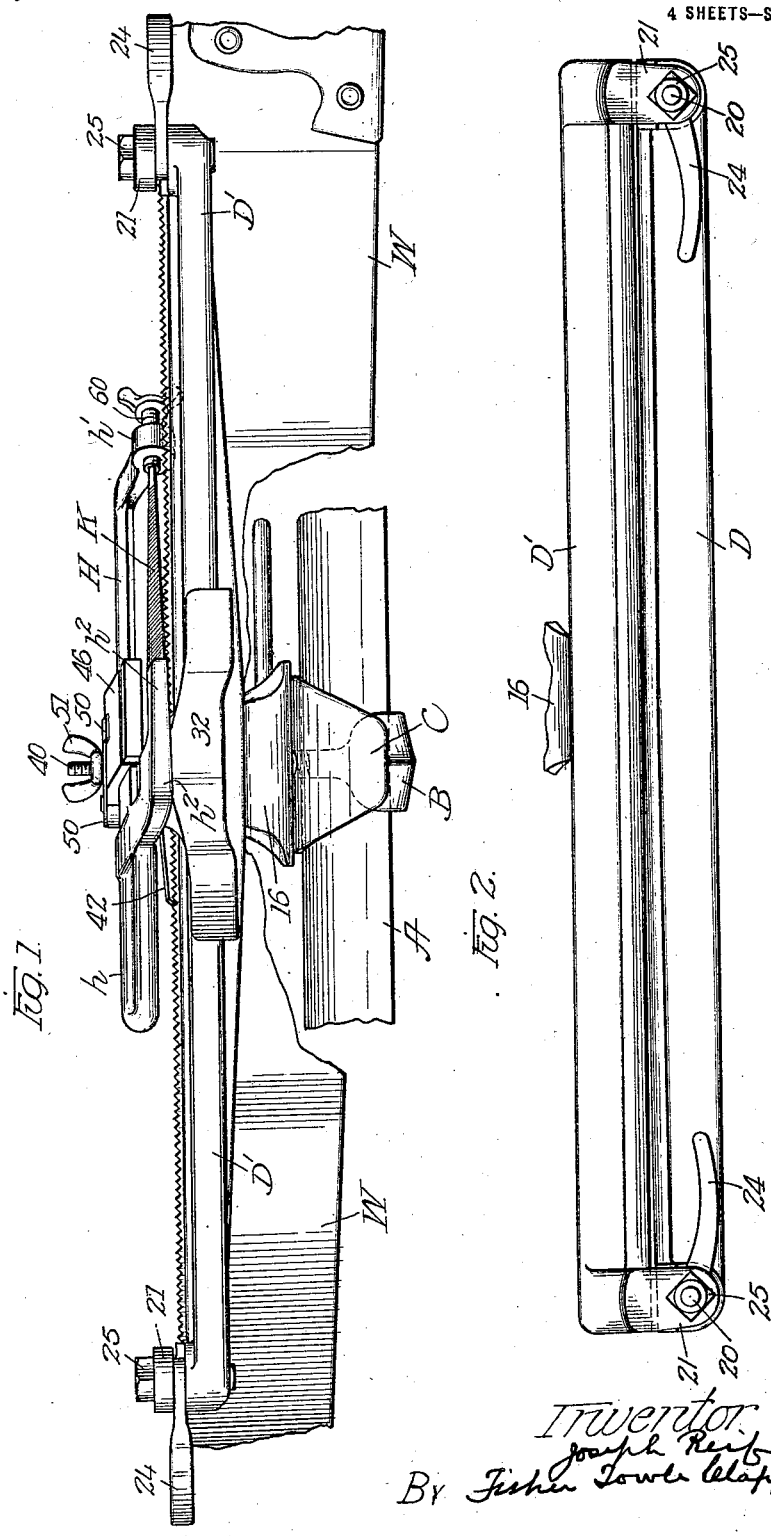

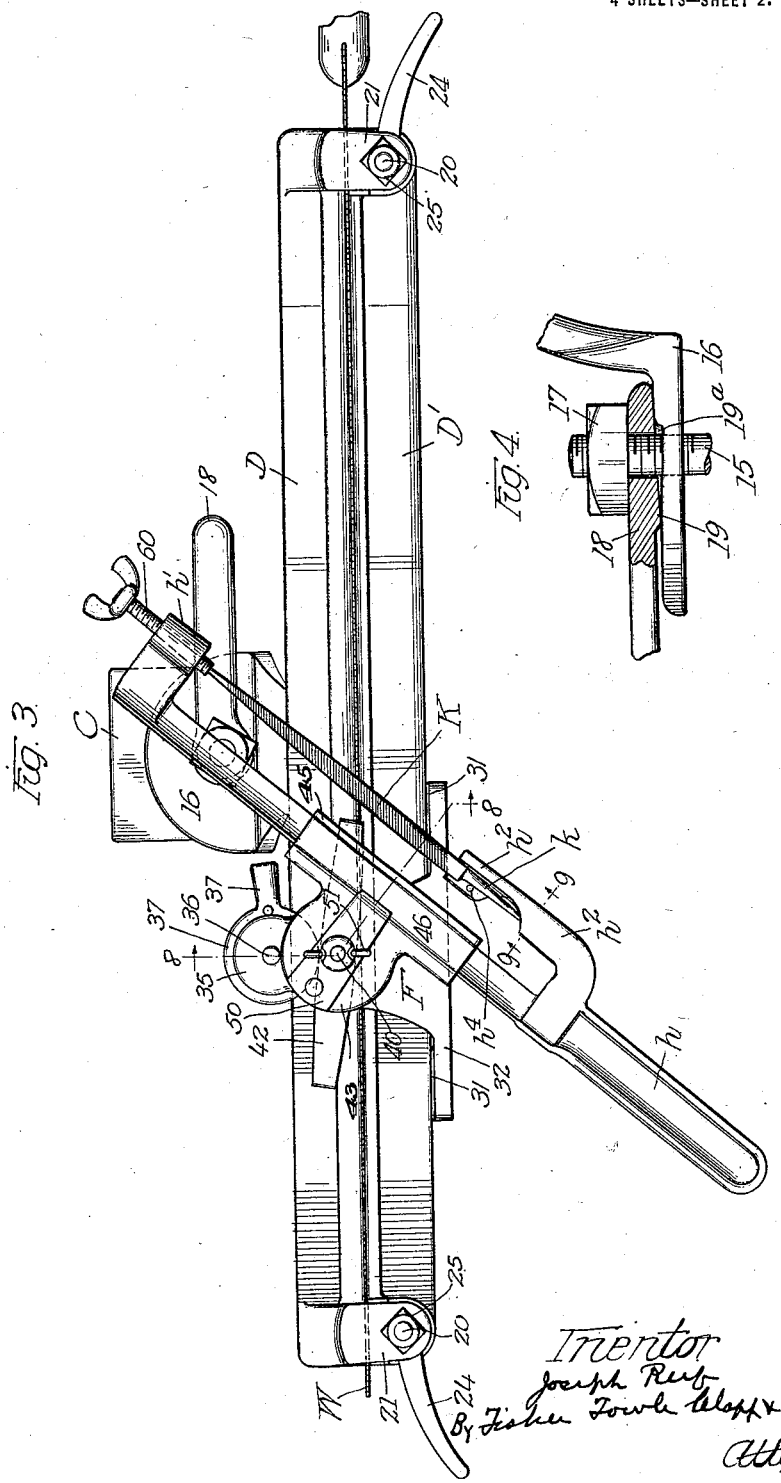

J. REIF.
SAW FILING MECHANISM.
APPLICATION FILED JUNE 1, 1920.
1,407,168.
Patented Feb. 21, 1922.
4 SHEETS—SHEET 4.
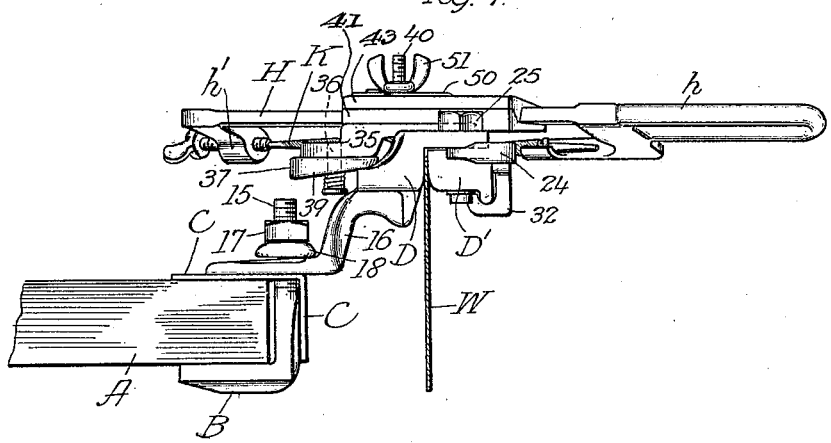
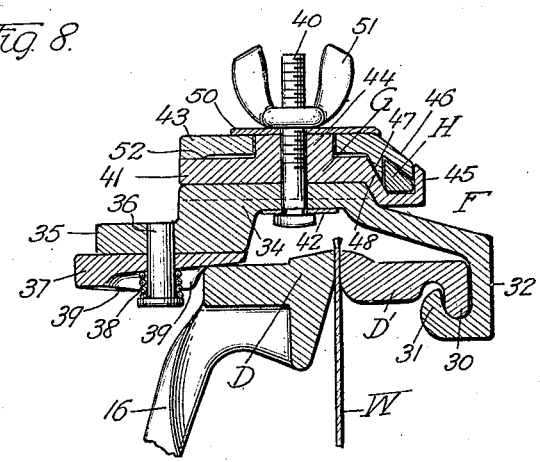

UNITED STATES PATENT OFFICE.

JOSEPH REIF, OF HEBRON, INDIANA, ASSIGNOR OF FORTY-FIVE PER CENT TO FRANCIS E. LING, OF HEBRON, INDIANA.

SAW-FILING MECHANISM.

1,407,168.  Specification of Letters Patent.  Patented Feb. 21, 1922.

Application filed June 1, 1920. Serial No. 385,483.

*To all whom it may concern:*

Be it known that I, JOSEPH REIF, a citizen of the United States, residing at Hebron, county of Porter, and State of Indiana, have invented certain new and useful Improvements in Saw-Filing Mechanism, of which I do declare the following to be a full, clear, and exact description, reference being had to the accompanying drawings, forming a part of this specification.

My present invention has for its object to provide an extremely simple, durable and effective construction of saw filing mechanism, and the invention consists in the various features of novelty and combination of parts hereinafter described, illustrated in the accompanying drawings and particularly pointed out in the claims at the end of this specification.

Figure 1 is a view in front elevation of a saw filing device embodying my invention. Figure 2 is a detail plan view of a pair of jaws for holding the saw blade to be filed. Figure 3 is a plan view of the parts shown in Fig. 1. Figure 4 is an enlarged detail view, partly in elevation and partly in vertical section, showing the manner of connecting the pair of saw holding jaws to a clamp for supporting the same. Figure 5 is a plan view similar to Fig. 3 but showing the file guide in reverse position. Figure 6 is a detail end view of the pair of clamping jaws showing the manner of connecting these jaws together. Figure 7 is a view showing my improved mechanism in end elevation. Figure 8 is a view in vertical section on line 8—8 of Fig. 3. Figure 9 is a view in vertical section on line 9—9 of Fig. 3.

Referring to the drawings, A designates a suitable support, such as a work bench, whereon my improved mechanism will be sustained. To the edge of the support A is connected a clamp that preferably comprises the lower and upper members B and C that engage the opposite surfaces of the support A (see Fig. 7). As shown, the lower member B is formed as a plate having extending upwardly therefrom a threaded bolt 15 that passes through the member C and through a hole formed in a bracket 16 that projects from one of the jaws by which the saws blade will be held. Upon the upper end of the bolt 15 is mounted a nut 17 and between this nut and the horizontal portion of the bracket 16 is arranged a cam lever 18 (see Fig. 4), having an inclined or cam-shaped rib 19 on its under surface adapted to cooperate with a correspondingly inclined part 19ª formed on the upper portion of the bracket 16, as clearly shown in Fig. 4 of the drawings.

When the device is placed upon the support A as shown in Fig. 7, the nut 17 will be screwed downward upon the bolt 15 so as to effect the initial clamping of the parts of the jaws B and C to the support; but the nut 17 will not be turned down so far as to prevent (with slight effort) the turning or swiveling of the bracket 16 upon the bolt 15. When, however, the bracket 16 has been turned so as to bring the device into the position for giving the best light upon the saw or locating the parts where the file can be most conveniently manipulated by the operator, the cam lever 18 will be turned so as to tightly clamp the bracket 16 against the upper jaw C and thus securely retain the saw-holding jaws and parts carried thereby against accidental movement. By reversely shifting the cam lever 18, the saw-holding jaws and parts carried thereby can be shifted and in this way, by simply moving the lever 18, the necessity for manipulating the nut 17 which would require a wrench, is avoided.

The extension 16 is shown as formed integral with one of the pair of saw-holding jaws D and D' that serve to securely grip the saw blade W to be filed. The jaws D and D' are connected together at their ends, the connecting means at the opposite ends being the same and comprising a bolt 20 that passes through a raised arm 21 projecting from the inner jaw over the corresponding end of the outer jaw D and extending also through a slot in the end of the outer jaw D. The outer jaw D is formed with a raised lug 23 (see Fig. 6) having a seat to receive the offset portion of the clamping lever 24 that is held upon the bolt 20. The nut 25 engages the upper threaded end of the bolt 20. When the clamping levers 24 are in the position shown in Fig. 2 of the drawings, the saw-holding jaws D and D' will be sufficiently separated to permit the saw blade W to be inserted between them. When, however, the clamping levers 24 are swung towards the position shown in Fig. 6 of the drawings, the jaws D and D' will be brought to firm bearing against the opposite faces of the saw blade W. By reference to Fig. 2, it will be seen that one of the jaws (the jaw D, for example) has its bearing edge slightly convexed from its center to its ends. The purpose of thus forming the jaw D is to ensure a more uniform bearing of the jaw throughout its length upon the saw blade W when the clamping levers 24 have been swung to cause the jaws to grip the blade. The convex central portion of the jaw D first bears against the saw blade and as the clamping levers 24 are swung outwardly, the bar D is slightly flexed so that a more uniform clamping of the saw blade throughout the length of the jaws is secured than would be possible if the bearing face of the jaw D were straight from end to end. This is a feature of advantage because it insures the most rigid holding of the saw blade at all points while its teeth are being sharpened.

By reference to Figures 7 and 8, it will be seen that the saw-holding jaw D' is formed on its under side with a rib 30 that extends from end to end of the jaw and with this rib 30 engages hook-shaped ribs 31 formed at the ends of the depending portion 32 of the sliding carriage, which as an entirety is designated F. This sliding carriage F is preferably formed as a casting of the shape shown more particularly in Figs. 3 and 8 of the drawings. The raised portion 34 of the carriage F that extends over the jaws D and D' is formed with an extension 35 (see Fig. 8) from which depends a pin or stud 36 on which is mounted a hand lever 37 (see Fig. 3). A spring 38 is arranged between the head of the pin 36 and the lever 37, serving to hold the upper surface of the lever in frictional engagement with the under side of the extension 35. The under surface of the lever 37 is formed with a cam rib 39 adapted to ride upon the upper face of the jaw D, the extent to which the rib 39 overlaps the edge of the jaw D being determined by the swinging movement of the lever 37. By means of this lever 37, the carriage F can be lifted to vary the distance above the jaws D and D' and the depth of cut of the file can thereby be accurately adjusted, as will presently more fully appear.

Through the raised portion of the carriage F passes a bolt 40 and between the headed lower end of this bolt and the raised portion 34 of the carriage is arranged a gauge pawl 42 that can be swung slightly upon the bolt 40, for a purpose to be presently described.

Upon the top of the sliding carriage is mounted the file guide that is designated as an entirety by the reference letter G. As shown, this file guide comprises a lower jaw member 41 and an upper jaw member 43, the lower member 41 being preferably formed with a boss 44 that passes through a hole in the upper member 43. The lower member 41 of the file guide is formed with a channel-shaped extension 45 within which will rest the slide bar H of the file holder (see Fig. 8). The upper member 43 of the file guide is formed with an extension 46 adapted to project over the slide bar H of the file holder and with a V-shaped rib 47 adapted to extend into the space between the back edge of the slide bar H and the inclined rear wall 48 of the channeled portion of the member 41. Upon the top of the member 43 of the file holder is arranged a plate spring 50 and through this spring passes the bolt 40, this bolt also passing through the member 41 and being provided with a wing nut 51 whereby the spring 50 can be forced to bear upon the member 43. The hole in the upper member 43 of the file holder through which the boss 44 passes is of slightly greater diameter than the boss and upon the under side of the upper member 43 is formed a slide rib 52. The slide bar H of the file holder by its constant reciprocation is apt to reduce or wear away the part of the upper member 43 immediately about it and when this occurs, the operator can remove the upper member 43 of the file guide and file away more or less the rib 52 upon the under side of the member 43. This will permit the spring 50 (which normally may be slightly bowed upwards at its center) to force the V-shaped rib 47 down the inclined portion 48 of the lower member 41 of the file guide and thus insure a snug engagement of the members of the file guide with the slide bar H. I regard it highly advantageous to use a spring, such as the spring 50 for example, for forcing the members 41 and 43 of the file guide into engagement with the slide bar H, because in this way an easy reciprocating movement of the file holder with the minimum of vibration is insured and yet without sufficient friction or binding of the parts to interfere with such reciprocation of the slide bar H.

The upper surface of the raised portion 34 of the carriage F is of circular outline so as to permit the file guide G which rests thereon to turn about the bolt 40 as a center of motion, when the wing nut 51 is loosened.

The file holder that serves to securely hold the file K by which the sharpening of the saw teeth will be effected comprises the slide bar H, a handle h by which the file holder is manipulated, and offset parts h' and h² to which the ends of the file K are connected. (See Fig. 5). The offset part h' is formed with a threaded hole extending therethrough to receive the screw 60, this screw having a thumb nut at its upper end and having its inner end provided with a seat to receive the small end of the three-cornered file K. The offset portion h² of the file holder (see Figs. 3 and 9) is formed as a casting integral with the handle h and having a seat to receive the end of the shank portion k of the file and a guard pin h⁴ to retain the shank k in place on the end of the offset portion h². In placing the file in position within the file holder, the shank k will first be inserted into the seat of the offset portion h², as shown in Fig. 3, and will then be turned down so that the shank will rest between the pin h⁴ and the outer upstanding part of the offset portion h². The screw 60 will then be forced inward until the point of the file is within the seat formed in the end of the screw.

From the foregoing description, the operation of the parts will be seen to be as follows: The saw blade W to be filed will be placed between the working edges of the clamping jaws D and D' and the clamping levers 24 will then be swung outwardly from the position shown in Fig. 2 of the drawings, so as to securely and rigidly hold the saw blade. The operator can then turn the extension 16 upon the pivot bolt 15 so as to bring the parts in most desirable position for use. The file guide will then be swung upon the pivot bolt 40 until the file K extends at such angle to the saw blade W as to give the desired bevel or angle of cut to the teeth of the saw. The thumb nut 51 will then be tightened so as to securely hold the file guide in this position. The hand lever 37 will be turned so as to hold the file guide at the desired elevation above the teeth of the saw and so determine the depth of cut of the file. The spring pawl 42 will then be turned to the position shown in Fig. 3 of the drawings so that one of its ends will engage with the spaces between the teeth of the saw blade and serve as a gauge or check to enable the operator to accurately advance the slide carriage F uniformly from end to end of the saw.

After the sliding carriage F has thus been advanced from end to end of the jaws D and D' and the operator has filed the edges of alternating teeth, the file guide holder will be swung around from the position shown in Fig. 3 to the position shown in Fig. 5 of the drawings so that the alternating teeth of the saw blade may be properly filed or beveled. When the file guide and holder are thus turned to the position shown in Fig. 5, the spring pawl 42 will be swung about its pivot point so as to bring its opposite end into engagement with the teeth of the saw and the sliding carriage will be advanced from one end to the other of the clamping jaws until the filing of the teeth of the saw blade has been completed.

My improved mechanism affords a most effective means whereby the teeth of saws may be sharpened and insures that the cutting face of the file is always at the proper angle to the vertical to effect a most accurate and uniform sharpening of the teeth. The file guide so holds the file holder that as the file is reciprocated back and forth in guiding the teeth, it cannot shift lengthwise of the saw and hence the file will always cut the proper edges of the teeth at the proper points or distances apart and give them the proper angle and "hook". The pawl 42 being preferably of spring metal, allows the file to press down on the forward or push stroke, which is its cutting stroke, but permits the file on the reverse stroke to ride free. This I regard as an important feature, although the operation of this pawl as a spacing device to determine the accurate step by step movement of the slide carriage is also highly important, as it enables a uniform spacing of the teeth to be had. Moreover, by forming this pawl 42 as a double-ended pawl, one end is always thrown out of action when the other end is turned to position for use.

While I have described what I regard as the preferred embodiment of my invention, I wish it understood that the details of construction above set out may be varied within wide limits without departing from the spirit of the invention and that features of the invention may be employed without its adoption as an entirety.

Having thus described my invention, what I claim as new and desire to secure by Letters Patent is:

1. A saw filing device comprising a pair of long jaws for holding the saw blade to be filed, one of said jaws having lugs or extensions at its ends, bolts passing through said extensions of one jaw and through the ends of the other jaw, and means at the ends of said jaws for drawing said jaws together to clamp the saw.

2. A saw filing device comprising a pair of long jaws for holding the saw blade to be filed, a carriage slidable upon one of said jaws and having means for engagement with said jaw in manner permitting vertical movement of said carriage, and a file guide adjustably mounted upon said slidable carriage.

3. A saw filing device comprising a pair of long jaws for holding the saw blade to be filed, one of said jaws having a longitudinal rib adjacent its edge, a sliding carriage mounted upon said jaw and having means for engagement with said rib in manner permitting vertical movement of said carriage, a file guide pivotally mounted upon said carriage, and means for holding said file guide in adjusted position.

4. A saw filing device comprising a pair of long jaws for holding the saw blade to be filed, a carriage slidable upon one of said jaws and having means for engagement with said jaw in manner permitting vertical movement of said carriage, a file guide pivotally mounted upon said carriage, means for adjusting the position of said file guide with respect to said carriage, and a file holder suitably mounted in said file guide.

5. A saw filing device comprising a pair of long jaws for holding the saw blade to be filed, a carriage slidable on one of said jaws and extending above both of said jaws, means for adjusting said sliding carriage with respect to the saw blade held by said jaws, and a file guide adjustably mounted upon said carriage.

6. A saw filing device comprising a pair of long jaws for holding the saw blade to be filed, a sliding carriage connected to one of said jaws and extending above both of said jaws, means for adjusting said sliding carriage with respect to the saw blade held by said jaws, said means comprising an adjustable cam, and a file guide adjustably mounted upon said carriage.

7. A saw filing device comprising a pair of long jaws for holding the saw blade to be filed, a sliding carriage connected to one of said jaws and extending above both of said jaws, means for adjusting said sliding carriage with respect to the saw blade held by said jaws, said means comprising a revoluble cam extending between said sliding carriage and one of said jaws, a spring exerting pressure upon said cam, and a file guide adjustably mounted upon said carriage.

8. A saw filing device comprising a pair of long jaws for holding the saw blade to be filed, one of said jaws having a depending rib upon its under side, a sliding carriage having a depending portion adapted to interlock with said rib, the body of said carriage extending across said jaws, a file guide adjustably mounted upon said sliding carriage, and a reciprocatory file holder carried by said file guide.

9. A saw filing device comprising a pair of long jaws for holding the saw blade to be filed, a carriage slidable upon said jaws, a spacing pawl connected to said sliding carriage and arranged above the opposing faces of said jaws, a file guide mounted upon said sliding carriage, and a reciprocatory file holder carried by said file guide.

10. A saw filing device comprising a pair of long jaws for holding the saw blade to be filed, a carriage slidable upon said jaws, a double-ended, adjustable pawl connected to said sliding carriage and arranged above the opposing faces of said jaws, a file guide mounted upon said sliding carriage, and a reciprocatory file holder carried by said file guide.

11. A saw filing device comprising a pair of long jaws for holding the saw blade to be filed, a carriage slidable upon said jaws, a file guide pivotally mounted upon said carriage, a file holder slidably mounted in said file guide, and means for adjusting said file guide and said file holder at different angles with respect to the saw blade to be filed.

12. A saw filing device comprising a pair of long jaws for holding the saw blade to be filed, a carriage slidable upon said jaws, a spacing pawl connected to said sliding carriage and arranged above the opposing faces of said jaws, said spacing pawl being formed of spring metal, a file guide mounted upon said sliding carriage, and a reciprocatory file holder carried by said file guide.

13. A saw filing device comprising a pair of long jaws for holding the saw blade to be filed, a sliding carriage mounted above said jaws, a bolt extending upwardly from said carriage, a file guide pivotally mounted upon said bolt, means for adusting the position of said file guide with respect to said carriage, and a file holder slidably mounted in said file guide.

14. A saw filing device comprising a pair of long jaws for holding the saw blade to be filed, a sliding carriage mounted above said jaws, a file guide adjustably mounted on said sliding carriage, comprising upper and lower members having a space between them to receive a file holder, a spring for forcing said members towards each other, and a file holder slidably mounted between said members of the file guide.

15. A saw filing device comprising a pair of long jaws for holding the saw blade to be filed, a sliding carriage mounted above said jaws, a file guide adjustably mounted upon said sliding carriage and comprising upper and lower members, one of said members being formed with a channel to receive a file holder and the other of said members being provided with a V-shaped rib to engage said file holder, a bolt and nut for adjusting said members of the file guide with respect to the file holder, and a file holder having a sliding bar mounted between said members of the file guide.

16. A saw filing device comprising a pair of long jaws for holding the saw blade to be filed, a sliding carriage mounted above said jaws, a bolt extending upwardly from said carriage, a file guide pivotally mounted upon said bolt and comprising upper and lower members having a space between them to receive a file holder, a spring mounted upon said bolt for pressing said members of the file guide towards each other, an adjusting nut mounted upon said bolt, and a file holder slidably mounted between the members of said file guide.

17. A saw filing device comprising a pair of long jaws for holding the saw blade to be filed, a carriage slidable upon said jaws, a file guide adjustably mounted on said carriage, and a file holder comprising a bar slidably mounted in said file guide, said file holder having at one end a part to receive the shank of a file and having at its opposite end a screw adapted to engage the point of the file.

JOSEPH REIF.